(No Model.)
H. M. HERRING.
ORNAMENTAL CHAIN.
No. 273,733. Patented Mar. 13, 1883.
Fig. 1.
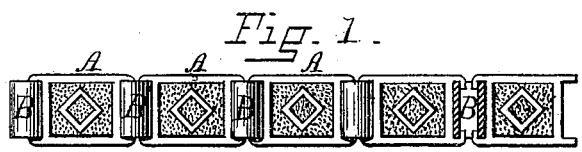
Fig. 2.
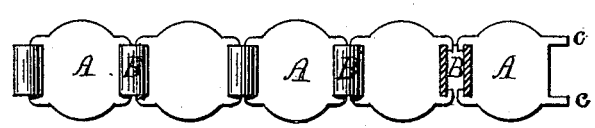
Fig. 3.
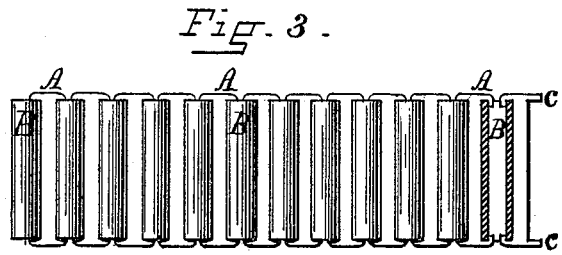
Fig. 4.    Fig. 5.    Fig. 6.    Fig. 7.
 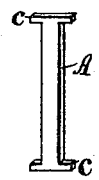  
WITNESSES:
C. H. Leuther Jr.
Wm. L. Cook
INVENTOR:
Henry M. Herring
by Joseph A. Miller & Co
Attys
N. PETERS. Photo-Lithographer, Washington, D. C.

UNITED STATES PATENT OFFICE.

HENRY M. HERRING, OF NORTH ATTLEBOROUGH, MASSACHUSETTS.

ORNAMENTAL CHAIN.

SPECIFICATION forming part of Letters Patent No. 273,733, dated March 13, 1883.

Application filed January 22, 1883. (No model.)

*To all whom it may concern:*

Be it known that I, HENRY M. HERRING, of North Attleborough, in the county of Bristol and State of Massachusetts, have invented a certain new and useful Improvement in Ornamental Chains; and I hereby declare the following to be a full, clear, and exact description of the same, reference being had to the accompanying drawings, forming part of this specification.

This invention has reference to an improvement in the construction of ornamental chains; and it consists in the peculiar and novel manner in which the links are connected together to form the chain, as will be more fully set forth hereinafter.

Figure 1 is a view of one form of ornamental chain, shown partly in section, constructed after my invention. Fig. 2 is a view of a slightly modified form of chain, also partly in section. Fig. 3 is a view, partly in section, of an ornamental band or roller chain constructed after my invention. Fig. 4 is a perspective view of one form of link. Fig. 5 is a perspective view of a square link used for connecting the tubes shown in Fig. 3. Fig. 6 is a view of a round connecting-link, and Fig. 7 is a view of a tube used in making the ornamental chains.

In the drawings, A A are the blanks or links composing part of the ornamental chain. They may be of any desired form of outline, and may form the main part of the chain or only the connecting part.

B B are tubes, which are used as connecting-links between the main links A A, as is shown in Figs. 1 and 2; or they may form the main portion of the chain, as is shown in Fig. 3.

The pieces A A, whether they form the main links in the chain or are used only to connect the tubes B B, so as to form a chain, are always provided with the projecting ends C C, which may be formed in one piece with the link A, as shown in Figs. 1, 2, 3, 4, and 5; or they may be soldered onto the link, as shown in Fig. 6, where the stem of the link is round and the ends C C are secured to the same by solder.

To form the chain, the links A and tubes B are placed together, and the laterally-projecting ends C C are bent over the ends of the tubes B, so as to extend into the same, and thus form a flexible hooked connection, as is shown in the sectional portion of Figs. 1, 2, and 3, producing a strong, durable, and flexible chain in which all the parts can be gilded, colored, and finished before they are put together.

A great variety of patterns and designs may be produced by varying the style or pattern of the links A, and watch-chains, neck-chains, waist-chains, bracelets, and other ornamental chains of great durability may be produced at a low cost and without the use of skilled labor, as an ordinary person can soon learn to secure the links together.

The lateral projections C C on the links A may on one end be formed into the hook shape in stamping the blanks for some of the chains, so that only one end requires to be bent into the tubes.

Having thus described my invention, I claim as new and desire to secure by Letters Patent—

1. In an ornamental chain, the combination, with the tubes B B, of the links A, provided with the lateral projections C C, bent into the tubes to connect the chain, as described.

2. An ornamental chain consisting of alternate links provided with laterally-projecting ends and tubes secured together by bending the laterally-projecting ends into the tubes, as described.

3. The combination, with the links A, provided with the hooked ends C C, of the tubes B B, constructed to connect the links into a chain, as described.

In witness whereof I have hereunto set my hand.

HENRY M. HERRING.

Witnesses:
J. A. MILLER, Jr.,
M. F. BLIGH.